Patented Dec. 19, 1922.

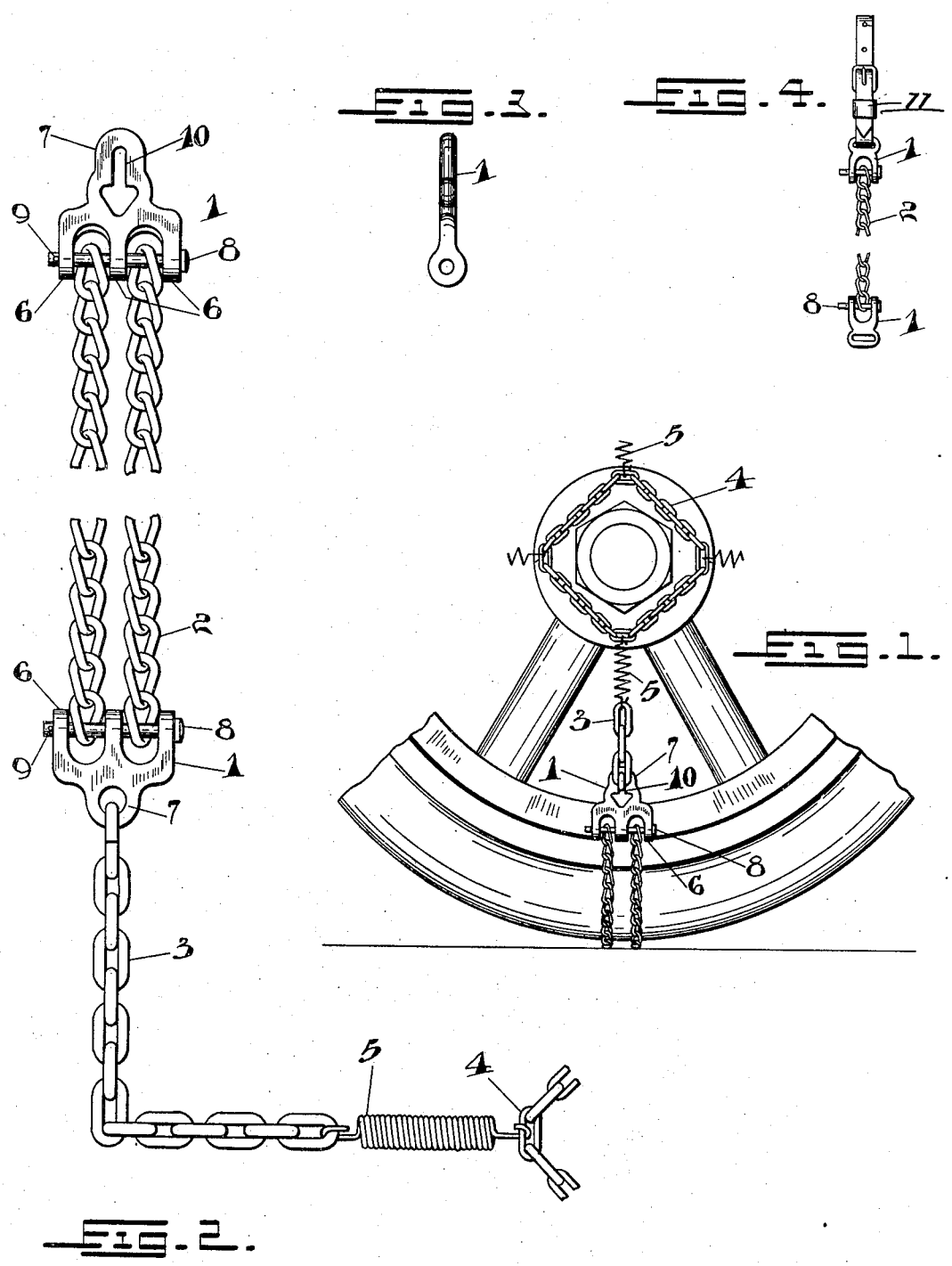

1,439,553

UNITED STATES PATENT OFFICE.

JAMES JOHNSTON, OF ST. CATHARINES, ONTARIO, CANADA, ASSIGNOR OF ONE-HALF TO WILLIAM J. O'PHEE, OF ST. CATHARINES, ONTARIO, CANADA.

TIRE CHAIN.

Application filed March 27, 1922. Serial No. 547,273.

*To all whom it may concern:*

Be it known that I, JAMES JOHNSTON, of the city of St. Catharines, in the county of Welland, Province of Ontario, Canada, a subject of the King of Great Britain, have invented certain new and useful Improvements in Tire Chains, of which the following is a specification.

This invention relates to tire chains of the type in which independent transverse tread chains are passed around the tire and the felloe of the wheel and are positioned by their connection by means of suitable connectors with securing chains, which are in turn engaged with anchoring means, and my object is to devise chains of this type in which any tread chain is easily removed and replaced and in which the means for securing the tread chains to the securing chains are simplified and cheapened.

I attain my object by means of the constructions hereinafter described and illustrated in the accompanying drawings in which—

Fig. 1 is a side elevation of part of a wheel showing one tread chain in position;

Fig. 2 a plan view of one tread chain with connectors, one securing chain, and the anchoring means adapted for connection with a plurality of such securing chains;

Fig. 3 a side elevation of one of the connectors, and

Fig. 4 a plan view of a single tread chain with a modified form of connector.

In the drawings like numerals of reference indicate corresponding parts in the different figures.

1 are connectors which serve as a connection between tread chains 2 and a securing chain 3. In practice a plurality of pairs of connectors are employed, each connecting one or more tread chains with a securing chain, and these securing chains are in turn anchored to a ring 4, which may be in the form of a metal rod or a chain, this ring being positioned concentric with the hub and at one side of the wheel in a manner well known in the art.

The securing chains 3 are preferably each connected with the ring 4 through the medium of a coil spring 5. Each connector is formed with jaws 6 and an eye 7. With each pair of connectors one or more tread chains 2 may be employed. In the drawings I show two tread chains and the jaws 6 are triple so as to maintain the ends of the tread chains 2 in spaced relationship. Through the jaws passes a pin 8 held in position by means of a cotter pin 9. One end of the connecting chain is permanently secured to the eye 7 of one of the connectors 1, (see the lower connector in Fig. 2) but I may make both connectors as shown at the top of Fig. 2 so that either may be detachably secured to the connecting chain 3. For this purpose in each eye 7 I form a keyhole slot 10, one end of the slot being adapted for the passage of the chain so that it may be drawn through the eye, while the smaller end of the slot will engage a cross link and thus form a non-sliding connection with the chain.

When a chain is to be placed in position, one end of the securing chain 3 being secured to one connector as shown in Fig. 1, the other end is passed through the eye of the other connector, and when the tread chain is brought to a proper position encircling the tire and felloe of the wheel, the smaller end of the eye is engaged with the securing chain in the manner hereinbefore described and the securing chain is hooked on to the corresponding coil spring 5. As many tread chains with their connectors may be employed as desired, and each corresponding securing chain hitched up to the ring 4.

In Fig. 4, I show a single tread chain detachably secured to two connectors in the manner hereinbefore described. In this form, as in the other shown, the tread chain is readily removed and replaced. The connectors, however, are shown as provided with eyes adapted for engagement with a strap 11 by means of which the device may be secured about the wheel felloe and tire.

From the above description it will be seen that I have devised a construction which will satisfactorily attain the objects of my invention as hereinbefore set out in this specification.

What I claim as my invention is:—

In tire chains, the combination of a plurality of tread chains; two one-piece connectors each formed with jaws and with an eye, the jaws being adapted to receive between them and to separate end links of the tread chains; a pin for each connector passing through the jaws and links of the tread chains between the jaws; a securing means connected at one end to the eye of one connector in part at least formed of chain, the eye of the other connector being formed as a keyhole slot through which the chain may be drawn and engaged therewith in any desired position and anchoring means to which the other end of the securing means is connected.

Signed at St. Catharines this 9th day of March, 1922.

JAMES JOHNSTON. [L. S.]

Witness:
JAMES G. A. M. SCHILLER.